United States Patent
Johansson

[11] 3,785,465
[45] Jan. 15, 1974

[54] CENTRIFUGAL CLUTCHES IN SERIES WITH BRAKE

[76] Inventor: Rolf Anders Gunnar Johansson, Vare, S-310, Unnaryd, Sweden

[22] Filed: Feb. 22, 1972

[21] Appl. No.: 228,061

[52] U.S. Cl............ 192/48.5, 30/383, 192/104 C, 192/145, 192/28, 192/17 C, 192/114, 192/105 BA
[51] Int. Cl. .................... F16d 21/08, F16d 67/02
[58] Field of Search................ 192/48.5, 48.3, 48.2, 192/48.4, 28, 17 C, 114, 145, 48.7

[56] References Cited
UNITED STATES PATENTS
| | | | |
|---|---|---|---|
| 2,074,510 | 3/1937 | Junkers | 192/114 R X |
| 2,447,007 | 8/1948 | Gravina et al. | 192/48.3 X |
| 2,974,769 | 3/1961 | Henderson | 192/103 C |
| 3,131,797 | 5/1964 | Bochan | 192/114 R X |

Primary Examiner—Benjamin W. Wyche
Attorney—Pierce, Sheffler & Parker

[57] ABSTRACT

A safety device for disengaging the driving portion of a centrifugal clutch of a chain saw when a safety grip is released. A drive disc on the motor shaft has a pivotal centrifugal drive arm for driving the centrifugal clutch hub yoke which is rotatable on the motor shaft. The drive arm is held in operative position against the centrifugal force by a locking arm, which is withdrawn when the safety grip is released, thereby releasing the drive arm and disengaging the drive to the centrifugal clutch. Simultaneously, a brake stops the clutch drum and thus the chain.

11 Claims, 10 Drawing Figures

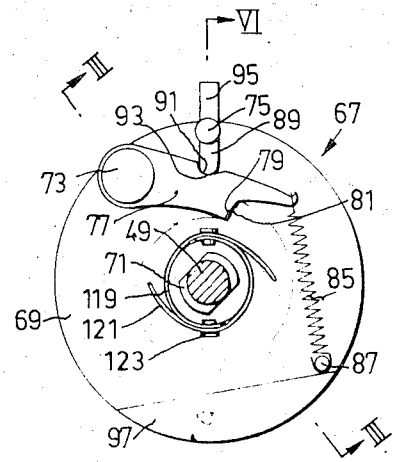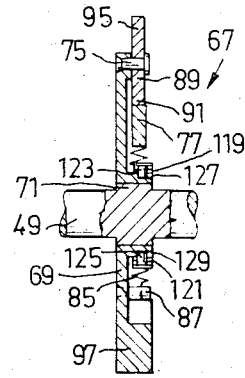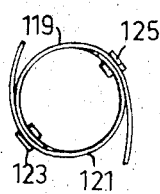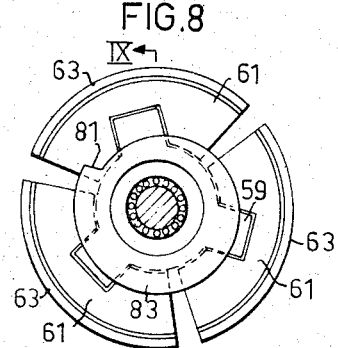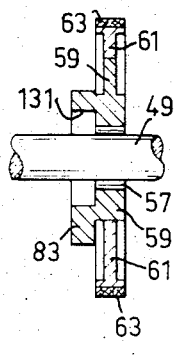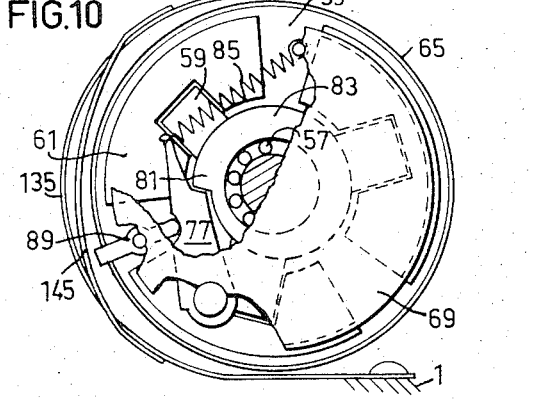

CENTRIFUGAL CLUTCHES IN SERIES WITH BRAKE

The present invention relates to a safety device for centrifugal clutch mechanisms operative between a motor and a device powered thereby, e.g., a tool, and in particular to a safety device for motor driven chain saws.

For safety reasons, it is often desirable that motor driven tools provided with centrifugal clutch mechanisms are equipped with means whereby the tool, e.g., the saw chain of a motor driven saw, can be stopped rapidly. It is desirable, in the case of certain particularly dangerous tools that the tool can be stopped practically immediately upon actuating a safety device. For a motor driven chain saw, for example, the saw chain should be arrested within one-tenth second. The main object of the present invention is therefore to provide means for this purpose and the invention is based on the concept that the power tool can be stopped practically instantaneously when braking the same by disconnecting the tool from the kinetic mass of the drive motor.

This object is achieved by means of the present invention which is mainly characterized in that the hub yoke of the centrifugal clutch is rotatably mounted on the motor dirven drive shaft and is driven thereby by means of a coupling means capable of being disengaged by a safety device tripping means.

Figure 2:
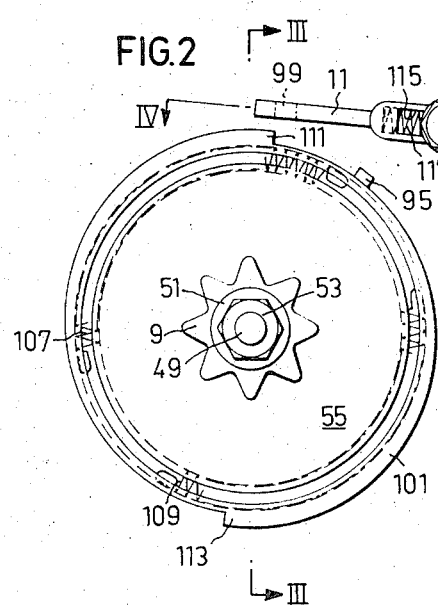
Figure 3:
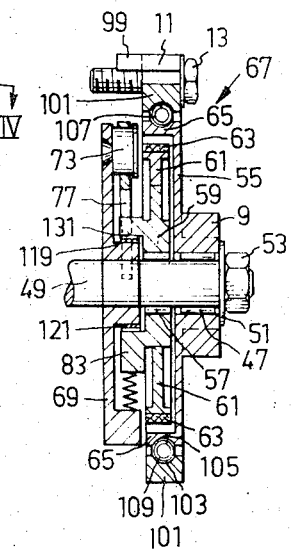
Figure 4:
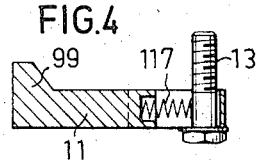

The invention will now be described in detail with reference to the accompanying drawings which illustrate a number of embodiments of the invention applied to a motor driven saw. In the drawings, FIG. 1 is a diagrammatic over-all view of a motor driven saw provided with the safety device of the present invention, FIG. 2 is a side view in larger scale of the stop ring and stop arm of the centrifugal clutch, FIG. 3 is a general view of the centrifugal clutch and safety device seen in section through the line III—III in FIG. 2, FIG. 4 is a sectional view of the stop arm taken through the line IV—IV in FIG. 2, FIG. 5 illustrates the drive pulley of the safety device seen from the centrifugal clutch, FIG. 6 illustrates the drive pulley of FIG. 5 in section through the line VI—VI, FIG. 7 is a side view of a synchronizing means for use with the device of the present invention, FIG. 8 is a side view of the hub yokes of the centrifugal clutch provided with clutch shoes, FIG. 9 is a sectional view taken through the line IX—IX in FIG. 8, and FIG. 10 illustrates an alternative braking and triggering means in side view and partly cut away.

Figure 1:
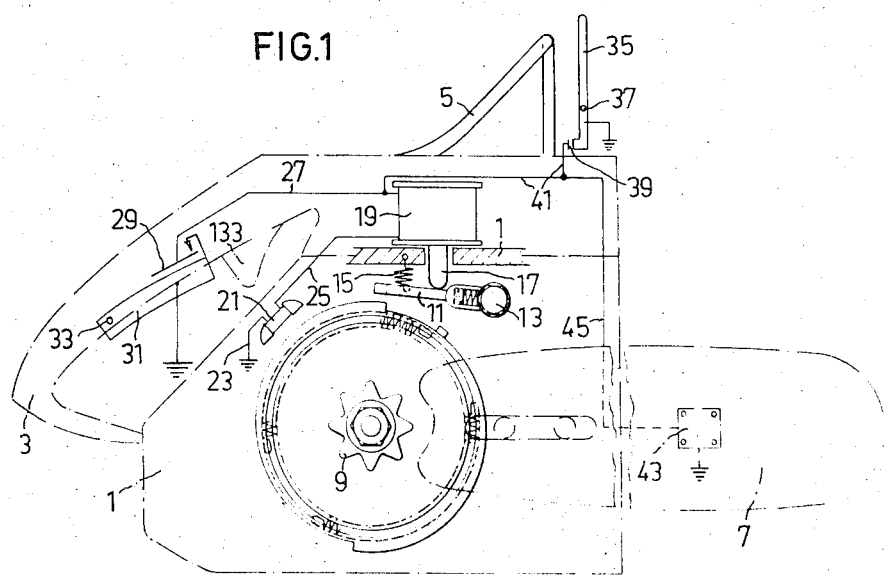

The motor driven saw diagrammatically illustrated in FIG. 1 comprises a housing 1, a rear handle 3, a front handle 5 and a guide bar 7. A chain drive 9 cooperating with a chain bracket (not shown) passing around the guide bar 7 is driven in a manner hereinafter described by the motor brackets (not shown) of the motor driven saw by means of a centrifugal clutch and a safety coupling constructed in accordance with the invention. The safety coupling of the invention disengages the centrifugal clutch from the motor shaft when a triggering device is actuated. In the embodiment illustrated in FIGS. 1–9, the triggering device comprises a stop or release arm 11 engaging the safety coupling, FIGS. 1–4 the arm 11 being pivotally attached to the housing 1 of the saw by means of a pin 13. The arm 11 is arranged in a manner to permit it to be swung down into engagement with the safety coupling against the action of a spring 15 by means of the armature 17 of an electro-magnet 19 mounted in the housing 1 of the saw. The electro-magnet 19 is energized from a generator coil 21, one side of which is grounded to the saw housing 1 via a line 23, while the other end is connected with one side of the coil of the electro-magnet via a line 25. The supply of current through the electro-magnet, and thus actuation of the safety coupling, is controlled in the ground connection of the electro-magnet.

As will be seen from FIG. 1, the electro-magnet 19 is connected with a contact 29 located in the rear handle 3 of the motor saw through a line 27. A safety hand grip 31 in the rear handle 3 is capable of pivoting around a shaft 33 and is connected with the body of the apparatus so that the electro-magnet 19 is connected with said body when the hand grip 31 is released into aubtment with the contact 29. A safety hand grip corresponding to the hand grip 31 may also be provided in the front handle 5 of the saw. The embodiment illustrated in FIG. 1, however, is provided with another safety operating means in the front handle. A stirrup member 35 is mounted for rotation in front of the front handle around a shaft 37. The stirrup member 35 is connected with the body of the apparatus and adapted to co-act with a contact 39 when pivoted forwardly, the contact 39 being connected through a line 41 with the line 27 extending to the electro-magnet 19. Thus, if the hand with which the front handle 5 is grasped during a working operation should slip therefrom, the hand will strike the stirrup 35 and swing it forwardly, whereupon the safety device becomes operative and the stop arm 11 will disengage the safety coupling.

The motor saw illustrated in FIG. 1 is provided with a further safety operating means in the form of an acceleration sensitive transmitter 43 arranged in the guide bar 7 and which, via a line 45, is connected with the line 41. The transmitter 43 is arranged to ground the electro-magnet 19 to the saw housing when the guide bar 7 is subjected to violent upward movement (kick-back), thus disengaging the safety coupling.

The centrifugal coupling and safety coupling will now be described in more detail with reference to FIG. 3.

The chain drive 9 is mounted for rotation on needle bearings 47 on the drive shaft 49 of the saw and are maintained in position axially on the shaft by means of a plate 51 and a nut 53 secrewed onto a threaded end of the drive shaft 49. The chain drive 9 is formed integrally with the clutch drum 55 of the centrifugal clutch. The centrifugal clutch also includes a hub yoke 59 (see also FIGS. 8 and 9) mounted on the drive shaft 49 by means of a needle bearing 57. The hub yoke is in the form of a three-armed star on which clutch shoes 61 are arranged for radial movement but are caused to rotate in a known manner. The clutch shoes 61 are provided with a frictional coating 63 attached peripherally as by glueing and adapted to co-act with a flange 65 of the clutch drum 55 projecting over the clutch shoes so that the drum is driven in a known manner by the hub yoke 59 of the centrifugal clutch when the rotational speed of the saw exceeds a certain engaging speed, for example 3,500 r.p.m.

In accordance with the invention, however, the hub yoke 59 is not fixedly attached to the drive shaft 49 but is connected thereto by means of a safety coupling 67, see FIGS. 3, 5 and 6.

The safety coupling comprises a drive disc 69 fixedly connected to the drive shaft 49. The drive disc 69 may be connected to the shaft by force fitting the disc on a non-round portion 71 located on said shaft 49.

When comparing FIGS. 6 and 3 it should be observed that the section illustrated in FIG. 6 is taken along the line VI—VI in FIG. 5 while the drive disc illustrated in FIG. 3 is cut along the line III—III in FIG. 5.

The drive disc 69 comprises a generally flat disc having connected to the periphery thereof two pivot pins 73, 75. Pivotally attached to each pin 73 is a centrifugal drive arm 77, on the side of which facing the drive shaft 49 is arranged a shoulder 79. The shoulder 79 is arranged to co-act with a shoulder 81 located on a cam 83 formed integrally with the hub yoke 59 of the centrifugal clutch and located on the side of the hub yoke 59 remote from the clutch drum 55. The shoulder 79 is held in engagement with the shoulder 81 by means of a tension spring 85 extending between the free end of the drive arm 77 and a pin 87 mounted on the drive disc substantially diametrically opposite the pivot pin 73.

When the motor reaches a certain rotational speed, for example 3,000 r.p.m., the centrifugal force on the arm 77 will be greater than the force of the spring 85, and hence the arm 77 will move outwardly in a manner to cause the shoulder 79 to disengage from the shoulder 81. This movement of the arm 77 is prevented, however, by a lock 89 which is pivotable around the second pivot pin 75 on the drive disc 69. In the position illustrated in FIGS. 5 and 6, the rounded inner end 91 of the lock 89 engages a recess 93 located in the drive arm 77 and thereby prevents the arm 77 from moving outwardly under the influence of centrifugal force. The outer end 95 of the lock 89 projects beyond the periphery of the drive disc 69 and is made heavier than the inner portion 91 of the lock 89, whereby the lock 89 takes the position illustrated in FIG. 5 when acted upon by centrifugal force. If, as a result of external influence by the outer end 95, the lock 89 is pivoted counter-clockwise when the drive disc 69 rotates, the inner end 91 of the lock 89 will leave the recess 93 in the arm 77 which is thus released to move outwardly under the action of centrifugal force at speeds exceeding 3,000 r.p.m. in a manner to cause the shoulder 79 to be disengaged from the shoulder 81. Under the influence of centrifugal force, the centrifugal drive arm 77 will hold the lock 89 in a position generally perpendicular to the position illustrated in FIGS. 5 and 6.

For the purpose of balancing the masses of the centrifugal drive arm 77 and the lock 89, the drive disc is provided with a counterweight 97 formed integrally with the disc and located diametrically opposite the arm 77 and the lock 89.

The lock 89 is operated by means of the aforementioned release arm 11. For this purpose, the release arm 11 is provided with a shoulder 99 on the free end thereof. The shoulder 99 strikes the outer end 95 of the lock 89 in a manner to cause the lock to be rotated anti-clockwise when the arm 11 is actuated by the electro-magnet 19.

The release arm 11 is also arranged to initiate braking of the clutch drum 55.

For this purpose, a brake ring 101 is arranged around the flange 65 of the clutch drum 55. The inner surface of the ring 101 and the outer surface of the flange 65 are provided with opposing, peripherally extending grooves 103 and 105, respectively. Located between the grooves 103 and 105 are two cylindrical springs 107 and 109. The springs are tensioned between attachments (not shown) located on the ring 101. The peripheral surface of the ring 101 is in the form of a camming surface having two shoulders 111, 113 arranged to co-act with the arm 11 when said arm is actuated by the electro-magnet 19. When the shoulder 111 or the shoulder 113 engages the end of the arm 11, rotational movement of the ring 101 ceases, whereby the springs 107 and 109 cause a frictional force to be applied to the clutch drum 55 to stop the same. To reduce the force of impact between the shoulders 111 and 113 and the end of the arm 11, a shock-absorbing means is arranged on the arm 11. To this end, the inner end of the arm 11 is provided with a groove 115 which permits the arm 11 to move in its longitudinal direction relative to the pin 13. Arranged in the groove 115 is a spring 117 which normally holds the arm 11 extended and which absorbs the impact energy.

The safety coupling 67 is also provided with means for preventing hard impacts between the shoulder 79 on the arm 77 and the shoulder 81 on the cam 83. The said means is in the form of a synchronizing device and comprises two curved leaf springs 119, 121 (FIGS. 7 and 6) which are fastened together by rivets 123, 125 in a manner to present outwardly projecting free ends. The synchronizing springs are mounted with the rivets 123, 125 engaging in grooves 127, 129 in the hub of the drive disc 69 (FIG. 6). When the drive disc 69 rotates, the springs 119, 121 are forced to accompany the movement thereof, wherewith the ends of the springs drag against the radial inner wall of a recess 131 located in the cam 83 of the hub yoke 59 of the centrifugal clutch (FIGS. 9 and 3). This means that the hub yoke 59 does not cease to rotate when the motor is disengaged but can be loosely carried by the disc 69 as it rotates so that subsequent engagement of the arm 77 and the cam 83 can be effected without excessive differencies in rotational speeds.

The mode of operation of the centrifugal clutch on the safety coupling will now be described in detail, it being assumed by way of example that the engaging speed of the centrifugal clutch is 3,500 r.p.m. and that the centrifugal force acting on the centrifugal arm 77 is greater than the force of the spring 85 at a speed of 3,000 r.p.m. or higher.

When the motor saw is to be started, the saw is held by the front handle and the starting cord pulled. The safety handle 31, the so-called dead-man's-grip located in the rear handle 3 of the motor saw, is thus not depressed, and hence the electro-magnet 19 is energized and forces the arm 11 down into its position of engagement. As soon as the motor starts, the lock 89 of the safety coupling 67 will engage the shoulder 99 of the arm 11, thereby releasing the drive arm 77. At low speeds, the centrifugal coupling is disengaged so that the chain drive 9 and the chain are maintained stationary. If the throttle of the motor, i.e., the finger grip 133 shown in FIG. 9, is latched in a position to permit a part flow of fuel to pass to the motor, the motor during the start will speed up to a rotational speed in excess of 3,000 r.p.m., whereby the centrifugal drive arm 77 is thrown outwardly to cause the hub yoke 59 to be disengaged from the drive disc 69. Thus, during a starting sequence, the motor is disengaged and the chain at rest.

When the motor saw is to be used in a sawing capacity, the safety handle 31 is gripped, whereby flow of current to the electro-magnet ceases. When this occurs, the arm 11 is drawn by the spring 15 away from the shoulder 111 or 113 on the ring 101, and the shoulder 99 simultaneously releases the lock 89. If fhe motor has a rotational speed exceeding 3,000 r.p.m., the drive arm 77 will take its outer position and does not drive the hub yoke 59. The arm 77 also holds the lock 89 in a tangential position. The motor is thus still disengaged, despite the fact that the safety handle 31 has been pressed in. In order for the motor to be engaged, its rotational speed must be decreased. When the rotational speed of the motor has been lowered to 3,000 r.p.m. or less and the safety handle 31 is still held pressed in, the spring 85 will draw the arm 77 inwardly in a manner to cause the shoulder 79 to engage the shoulder 81 and drive the hub yoke 59. The lock 89 is then swung to a radial position under the influence of centrifugal force, thereby reaching the condition illustrated in FIG. 5. Since the engagement takes places at a rotational speed below 3,500 r.p.m., the centrifugal clutch is disengaged and the chain does not therefore begin to move. The centrifugal clutch is not engaged to drive the chain until the rotational speed is re-increased.

If the rotational speed is less than 3,000 r.p.m. when the safety handle is gripped subsequent to a starting sequence, only the lock 89 is released, the lock thereby locking the drive arm 77 in the engagement position occupied thereby. The centrifugal coupling has disengaged the chain.

When the safety handle 31 is released or the stirrup 35 actuated during a working operation, the electromagnet 19 forces the arm 11 into its position of engagement, wherewith the ring 101 becomes operative and brakes the clutch drum and the chain. The arm 11 also actuates the lock 89. If the rotational speed of the motor exceeds 3,000 r.p.m., the arm 77 will then be disengaged from the shoulder 81 on the hub yoke 59 to disengage the motor. In this way, the clutch drum 55 and the chain are braked rapidly to a stand-still. If the rotational speed of the motor is less than 3,000 r.p.m., engagement between the centrifugal arm 77 and the shoulder 81 is not broken, but since this rotational speed is below the coupling speed 3,500 r.p.m. of the centrifugal clutch, the motor is already disengaged and the chain stopped. Since the motor is always disengaged in connection with braking movement of the chain, the kinetic energy of the motor need not be braked and neither is the motor stopped when the safety device is brought into operation.

Although the invention has been described with respect to a certain embodiment thereof, it is not restricted to such embodiment, numerous modifications being possible within the scope of this invention. Thus, the drive between the drive disc 69 and the hub yoke 59 need not be effected by means of only one drive arm but a plurality of such arms may be provided. Neither need the drive arm or arms be mounted for movement around a pin on the drive disc but may be pivotable in other suitable manners. Further, other engagement means than pivotable centrifugal arms are conceivable, for example radially displaceable slides. In the illustrated embodiments, engagement between the drive disc and hub yoke only takes place in one direction of rotation, although the drive arm and hub yoke may alternatively be provided with engagement means which act in both directions of rotation.

Such an arrangement may be of particular advantage on idling with two-stroke motors, in which the angular speed of the motor is very irregular and heavy impacts would otherwise repeatedly occur in the driving mechanism. Further, braking need not be effected on the drum of the clutch but can be effected at any suitable place on the power transmission means between the drum and the driven tool.

The lock 89 need not be actuated by a locking arm as illustrated but can be actuated by a movable cam. The cam can be combined to advantage with a strap brake for the clutch drum instead of the illustrated arrangement of the spring brake with the brake ring, thereby providing a simple construction which experiences smaller mechanical stresses. An example of such a construction is illustrated in FIG. 10, which shows the combined centrifugal clutch and the safety coupling as viewed from the drive disc, which is partially cut away. With the illustrated construction of FIG. 10, the electrical actuation of the safety coupling has been replaced with a mechanical actuating means. Alternatively, a hydraulic or pneumatic actuating means can also be used.

For the sake of simplicity, like parts in the construction of FIG. 10 and the embodiment of FIGS. 1-9 have been identified with like reference numerals. The drive disc 69 with the centrifugal drive arm 77 and lock 89, the hub yoke 59 with the cam 83 and co-rotating clutch shoes 61, and the clutch drum 55 with flange 65 are generally similar in construction to those previously described. One exception, however, is that the flange 65 of the clutch drum 55 is not provided with an outer groove and that no brake ring 101 or springs 107, 109 are provided in the construction of FIG. 10. This construction is also a mirror-image of the construction of FIGS. 1-9, and the shaft 49 does not extend through the drive disc 69.

The safety coupling is operated and braking of the clutch drum effected in the following manner: A circle arcuate braking band 135 is connected at one end to the housing 1 of the motor saw. The brake band 135 extends around the flange 65 of the clutch drum 55 and at its other end is provided with an attachment 137 for a spring 139, the other end of which is anchored by a pin 141 to the housing 1. The spring 139 attends to draw the band 135 against the flange 65 of the drum 55 and thereby brake the drum. In the position illustrated in FIG. 12, the brake band is prevented from engaging the flange 65 by reason of the fact that a rod 143, which is also connected with the band attachment 137, draws the attachment 137, and therewith the band 135, to the left as viewed in the drawing against the action of spring 139. The rod 143 is connected with the safety hand grip (not shown in FIG. 12) located in the rear handle of the motor saw and takes the position illustrated in FIG. 12 when the handle is pressed in. If the handle is released, the spring 139 will pull the band into abutment with the clutch drum 55. Attached to brake band 135 is a strip 145 of sheet metal, the strip 145 being attached in a manner such that it lies to one side of the plane of the brake band and slightly within the circle arc of said band. The sheet metal strip will therefore lie in the movement plane of the lock 89. When the safety device is brought into function and the brake band approaches the flange 65 of the clutch drum 55, the strip 145 will be engaged by the lock 89, which is thus pivoted and releases the centrifugal drive arm 77. Upon continued movement of the brake band 135, the band will abut the drum flange 65 and brake the same. With the embodiment illustrated in FIG. 12, the drive motor is disengaged before the clutch drum, and therewith the saw chain, are braked, whereby the motor is completely unaffected by the operation of the safety device.

What I claim is:

1. A safety device, for a power device such as a chain saw, arranged between a tool motor and a driving member such as a chain drive sprocket for a saw chain, rotatable thereby, said driving member being freely rotatable on the motor drive shaft and being rigidly connected with a drum cooperating with mechanical brake means; the safety device comprising two mechanical clutches transferring motor torque to the driving member, namely, a centrifugal clutch and a mechanical safety clutch, and common actuating means for the safety clutch and the brake means, wherein the safety clutch comprises a drive disc fixedly attached to said motor drive shaft and a coupling element movably attached to the drive disc and engageable with and disengageable from a centrifugal clutch hub yoke located adjacent said drive disc and is rotatable with respect to the drive shaft;

said centrifugal clutch cooperating with said drum connected with the driving member and the actuating means for the brake means cooperating with the drum being connected with an operating member for disengaging the coupling element of the safety clutch.

2. A safety device according to claim 1, characterized in that the brake means includes a portion of the clutch drum (55) formed as a braking drum (65), and that a braking element (135) is drawn against the drum when the safety actuating means is actuated for disengaging the coupling means.

3. A safety device according to claim 1, characterized in that the safety clutch is provided with a re-engaging means which engages the safety clutch when the rotational speed of the drive shaft falls to beneath the engaging speed of the centrifugal clutch.

4. A safety device according to claim 1, wherein the coupling element is actuated by a force urging the element out of its position of engagement, and wherein the element is capable of being locked in a position of engagement against the action of said force by means of a lock which is capable of being released by means of the actuating means.

5. A safety device according to claim 4, wherein extending outwardly from the hub yoke is a drive shoulder, and wherein the coupling element comprising a drive arm which is capable of being pivoted by centrifugal force, against the action of a spring, around a pin mounted on the drive disc, and wherein said lock is formed of a locking arm pivotally arranged on a second pin located on the drive disc, the locking arm when occupying its locking position extending substantially radially and the outer end of which is actuateable by the actuating means.

6. A safety device according to claim 5, wherein the spring actuating the drive arm overcomes the centrifugal force acting on the drive arm at rotational speeds below the engaging speed of the centrifugal clutch, and thereby pivots the drive arm into engagement position, and wherein the locking arm is adapted to take its radial locking position in response to the centrifugal force.

7. A safety device according to claim 1, wherein the actuating means comprises a means for rleasing said lock and adapted to be brought into a lock-releasing position when a hand grip located in a handle of the tool is released.

8. A safety device according to claim 7 arranged in a motor chain saw, wherein the release means is capable of being actuated by an acceleration sensing means arranged on the motor saw and arranged to release the lock when the saw is subjected to violent and lurching movements.

9. A safety device according to claim 3, wherein the brake means comprises a brake ring for braking said drum and being positioned around said drum, the outer surface of the ring presenting at least one shoulder adapted to co-act with the actuating means when disengaging the safety clutch.

10. A safety device according to claim 3, wherein the brake means includes a portion of said drum formed as a braking drum, and wherein a braking element is drawn against the drum when the actuating means is actuated for disengaging the safety clutch.

11. A safety device according to claim 10, in which the actuating means includes means mounted on the braking element for disengaging the safety clutch.

* * * * *